US007519824B1

(12) United States Patent
Peyravian et al.

(10) Patent No.: US 7,519,824 B1
(45) Date of Patent: Apr. 14, 2009

(54) TIME STAMPING METHOD EMPLOYING MULTIPLE RECEIPTS LINKED BY A NONCE

(75) Inventors: Mohammad Peyravian, Cary, NC (US); Allen Roginsky, Durham, NC (US); Nevenko Zunic, Wappingers Falls, NY (US); Stephen M. Matyas, Jr., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 09/458,410

(22) Filed: Dec. 10, 1999

(51) Int. Cl.
*H04L 9/00* (2006.01)
*G06F 7/04* (2006.01)
*H04K 1/00* (2006.01)

(52) U.S. Cl. .................. 713/178; 713/155; 713/168; 713/176; 713/185; 726/10; 380/255; 380/283

(58) Field of Classification Search .................. 707/100; 715/513; 380/283; 713/157, 178
See application file for complete search history.

(56) References Cited

U.S. PATENT DOCUMENTS

| 5,001,752 A | 3/1991 | Fischer |
| 5,136,646 A | 8/1992 | Haber et al. |
| 5,373,561 A | 12/1994 | Haber et al. |
| RE34,954 E | 5/1995 | Haber et al. |
| 5,781,629 A | 7/1998 | Haber et al. |
| 6,148,405 A * | 11/2000 | Liao et al. ............... 713/201 |
| 6,188,766 B1 * | 2/2001 | Kocher ..................... 380/246 |
| 6,367,013 B1 * | 4/2002 | Bisbee et al. ............ 713/178 |
| 6,510,513 B1 * | 1/2003 | Danieli .................... 713/156 |
| 6,601,172 B1 * | 7/2003 | Epstein .................... 713/178 |
| 6,853,988 B1 * | 2/2005 | Dickinson et al. ........... 705/75 |
| 2001/0032314 A1 * | 10/2001 | Ansper et al. ............ 713/176 |

FOREIGN PATENT DOCUMENTS

| WO | WO 99/16209 | 4/1991 |
| WO | WO 9203000 A1 * | 2/1992 |

OTHER PUBLICATIONS

Ammann P. et al. Distributed Timestamp Generation in Planar Lattice Networks, Aug. 1993, ACM Transactions on Computer Systems, vol. 11, No. 3, pp. 205-225.*
Neuman, B. Stubbeline, S. A Note on the Use of Timestamps as Nonces, Apr. 1993 ACM SIGOPS Operating Systems Review, vol. 27 Issue 2, pp. 10-14.*

* cited by examiner

*Primary Examiner*—Christopher A Revak
*Assistant Examiner*—Aravind K Moorthy
(74) *Attorney, Agent, or Firm*—Coats & Bennett, P.L.L.C.

(57) ABSTRACT

A method for time stamping a digital document employs a two-part time stamp receipt. The first part of the time stamp receipt includes identifying data associated with a document and a nonce. The second part of the time stamp receipt includes a time indication and the nonce. The nonce serves as a link between the first and second parts.

19 Claims, 1 Drawing Sheet

TIME STAMPING METHOD EMPLOYING MULTIPLE RECEIPTS LINKED BY A NONCE

BACKGROUND OF THE INVENTION

The present invention relates generally to cryptographic protocols and, more particularly, to a time-stamping protocol for time-stamping digital documents.

There are times when it is desirable to prove the existence of a document as of a particular date. For example, patent disputes concerning the inventorship of an invention often turn on who is able to produce corroborating documentary evidence dating their conception of the invention. A common procedure for dating records is to keep the records in a daily journal or notebook with each page sequentially numbered and dated. Another procedure for dating a record is to have the record witnessed by an uninterested or trusted party that can attest to the existence of the document. The increasing use of computers, however, makes these time-stamping methods obsolete. It is relatively easy to change the date-stamp added to a document by the computer when the document was created. Further, while it is difficult to alter a paper document without leaving some signs of tampering, digital records can be easily altered or revised without leaving any evidence of tampering. Therefore, people are less likely to trust a digital document than a paper document that has been time-stamped using conventional time-stamping procedures.

To be trusted, a time-stamping procedure for digital documents should meet the following criteria:

1. The data itself must be time-stamped, without any regard to the physical medium on which it resides.
2. It must be impossible to change a single bit of the data without that change being apparent.
3. It must be impossible to timestamp a document with a date and time different than the current date and time.

One method for time-stamping a digital document would be to archive the document with a trusted escrow agent. In this case, the document originator sends a copy of the digital document to a trusted escrow agent. The escrow agent records the date and time that the document was received and retains a copy in his archives. Later, if a dispute arises over the date of the document, the document originator can contact the escrow agent who produces his copy of the document and verifies that it was received on a particular date. This time-stamping procedure has a number of drawbacks. First, the document originator must disclose the contents of the document to the escrow agent. Also, large documents take a relatively long period of time to transmit to the escrow agent and they require a large amount of data storage.

An improvement of the escrow procedure is to use a hash of the document. Instead of sending the document to the escrow agent, the document originator hashes the document using a one-way hash algorithm and sends the generated hash value to the escrow agent. The escrow agent stores the hash value along with the date and time that it was received in his archives. Later the document originator can use the services of the escrow agent to prove the existence of the document as of a particular date. The disputed document can be hashed and the resulting hash value can be compared to the hash value stored by the escrow agent in his archives for equality. If the hash values are equal, the document is presumed to be in existence as of the date associated with the stored hash value. One advantage of this method is that the document originator does not need to disclose the contents of the document to the escrow agent.

The need to escrow the document or hash value can be eliminated by having a time stamping authority generate a certified time stamp receipt using a cryptographic signature scheme as taught in U.S. Pat. No. Re. 34,954 to Haber et al. and Fischer, U.S. Pat. No. 5,001,752. In this case, the document originator hashes the document and transmits the hash value to the time stamping authority. The time stamping authority appends the current date and time to the hash value to create a time stamp receipt and digitally signs the time stamp receipt with a private signature key. The time stamping authority's public verification key is distributed and available to anyone interested in validating a time stamp receipt created by time stamping authority. The public verification key is typically stored in a public key certificate signed by a Certification Authority so that anyone desiring to validate the time stamp receipt with the public key can have confidence in the authenticity of the key.

SUMMARY OF THE INVENTION

The present invention is a time-stamping protocol for time-stamping digital documents so that the date of the document can be verified. The method presumes the existence of a trusted agent referred to herein as the time-stamping authority (TSA). According to the present invention, a requester sends a document to be certified or other identifying data associated with the document to a time-stamping authority TSA. The TSA creates a two part time stamp receipt based on the document and a time indication. The first part of the time stamp receipt is made by combining the identifying data with a nonce. The second part of the time stamp receipt is made by combining a time indication with the nonce. The nonce serves as a link between the two parts of the time stamp receipt. Each part is separately signed and transmitted by the TSA to the requester.

DETAILED DESCRIPTION OF THE INVENTION

Figure 1:
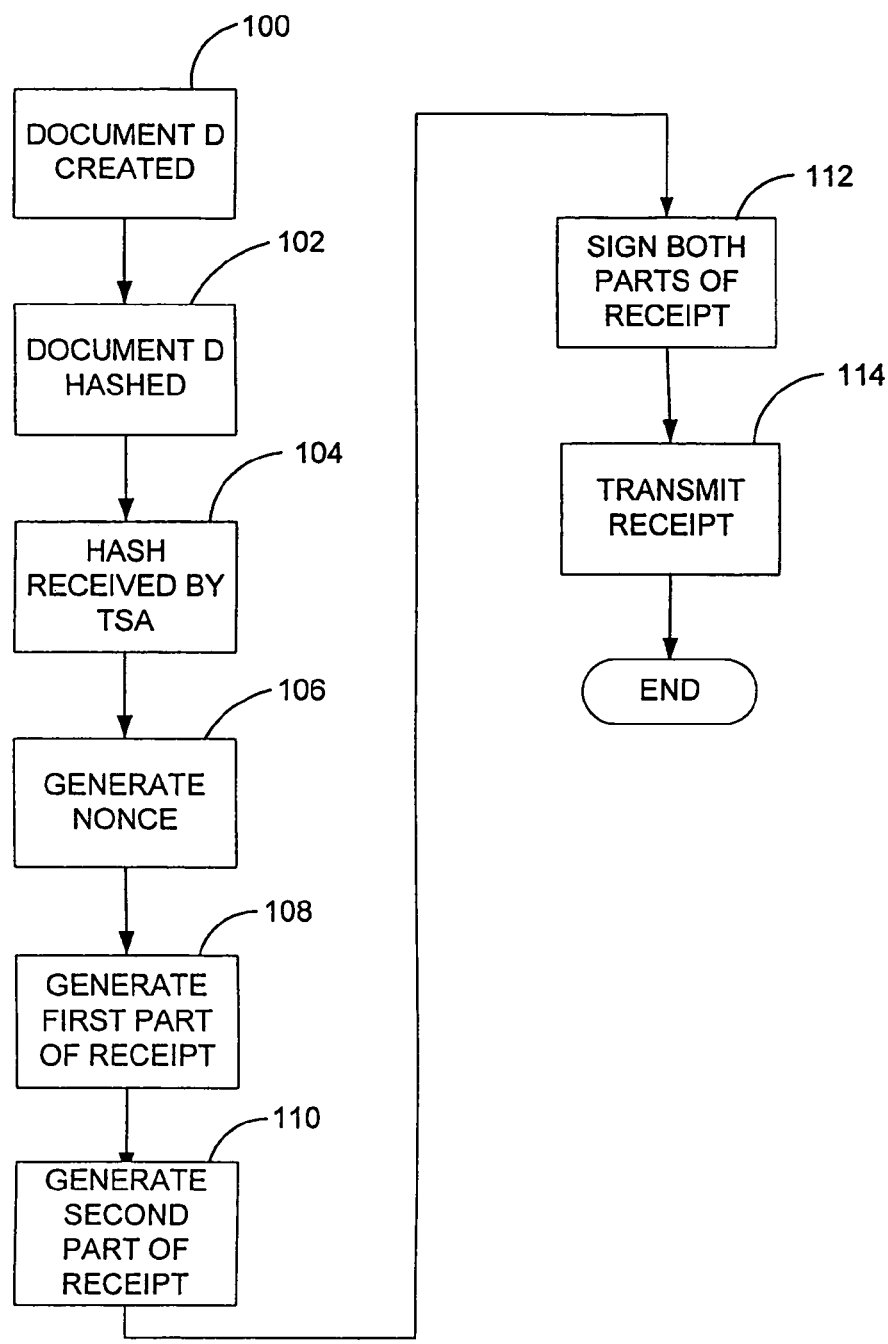
FIG. 1 is a flow diagram illustrating the time stamping method embodiment of the time stamping method of the present invention.

FIG. 1 is a flow diagram illustrating the general process of time-stamping a document according to the present invention. A document D is created at step 100. The document D is presumed to be in digital form and may comprise any alphanumeric, audio, or graphic presentation of any length. The document D may optionally be hashed at step 102 using a one-way hashing function. A hash function is a function that takes a variable length input string, called a pre-image, and converts it to a fixed-length string, called a hash value, denoted H. The pre-image in this case is the document D or selected portions thereof. A one-way hash function operates in only one direction. While, it is easy to compute a hash value from the pre-image, it is computationally impractical to find a pre-image that hashes to a given hash value. Thus, it is practically impossible to recover the pre-image given the hash value and knowledge of the hash algorithm. Another feature of a hashing function is that it is difficult to find any two pre-images that hash to the same value.

There are several advantages to sending a hash value H produced on document D instead of the document D itself. First, the hash value H improves security by functioning as a fingerprint of the document D. Changing a single bit in the document D will result in an entirely different hash value making it easy to detect efforts to modify a document D or hash value H. Second, the hash value H greatly reduces the amount of data that must be transmitted to the TSA. This factor can be important where the available bandwidth is limited. Third, by sending a hash value H in place of the document D, the content of the document D does not need to be disclosed to the TSA.

Any known hashing function, such as the SHA-1, MD5, and RIPEMD-160, can be used in the present invention. For the remaining description of the time stamping protocol, it will be assumed that the document D has been hashed and that the hash value H has been sent to the TSA in lieu of the document D. It is understood, however, that one can practice the invention by substituting D, selected portions of document D, or some other function of D in place of the hash value H in the protocol.

The hash value H generated on document D or a selected portion thereof is transmitted to and received by the TSA at step 104. After receiving the hash value H, the TSA generates a random value called a nonce N at step 106 and uses the nonce N and the current time T to generate a two-part time stamp receipt R at steps 108 and 110. Other optional data, such as an identification number ID of the document originator and/or a sequential record number SN could also be used to generate the time stamp receipt R. The optional data can be provided by the document originator or generated by the TSA. The current time T is generated by a trusted clock controlled by the TSA or alternatively obtained by the TSA from a trusted source.

The first part of the time stamp receipt R, denoted $R_1$, is generated by concatenating the hash value H generated on document D with the nonce N. Thus, $R_1$ is represented by the string (H, N). The second part of the time receipt R, denoted $R_2$, is generated by concatenating the current time T and the nonce N and is represented by the string (T, N). Optional data such as the user identification number ID and/or sequential record number SN can be included in either part $R_1$ or $R_2$ or, alternatively, each part may include a portion of the optional data.

The TSA separately signs the first and second receipts $R_1$ or $R_2$ at step 112 to generate a certified time stamp receipts denoted $sig(R_1)$ and $sig(R_2)$. The receipts $R_1$ or $R_2$ are signed using the TSA's private signature generation key $K_{PR}$. The signature generation key $K_{PR}$ is part of a public and private key pair $(K_P, K_{PR})$ used by the TSA to certify time stamp receipts. The private key is known only to the TSA. The public verification key $K_P$ is made available to the public so that anyone interested can verify or authenticate the TSA's signature. The public verification key $K_P$ can be stored in a certificate signed by a Certification Authority CA so that the TSA's public key $K_P$ can be validated and, hence, trusted by those using the public key $K_P$. Any known cryptographic signature scheme can be used by the TSA including, for example, the RSA algorithm.

At step 114, the TSA transmits the signed time stamp receipts $sig(R_1)$ and/or $sig(R_2)$ to the requester and the procedure ends.

In the event that a dispute arises concerning document D, the existence and substance and the document D as of a particular date can be proved by means of the two-part time stamp receipt. To verify the document D, the TSA's signature on the first and second time stamp receipts $sig(R_1)$ and $sig(R_2)$ are first verified using the TSA's public verification key $K_P$. Next, the disputed document D is verified against the hash value H contained in the first receipt $sig(R_1)$. In cases where the first receipt $sig(R_1)$ includes a hash value H generated on document D, a hash value H is generated on the disputed document D and compared for equality to the hash value H contained in the first part of the time stamp receipt $sig(R_1)$.

The date or time of the document D is verified by comparing the nonce N contained in the first receipt $sig(R_1)$ with the nonce N contained in the second receipt $sig(R_2)$. If the values of N are equal, the time T in the second receipt $sig(R_2)$ is taken to be the priority date of the document D.

In the described invention, the values H and N in $R_1$ are cryptographically bound together by signing $R_1$ with the TSA's private signature generation key $K_{PR}$ and likewise the values T and N in $R_2$ are cryptographically bound together by signing $R_2$ with the TSA's private signature generation key $K_{PR}$. Those skilled in the art will recognize that other cryptographic binding methods could be employed, and that the present invention is not limited to a binding method based solely on or restricted solely to certification methods based on digital signatures. Alternatively, the binding operation could be based on Message Authentication Codes (MACs). In that case, the TSA would compute message authentication codes, MAC1 and MAC2, on $R_1$ and $R_2$, respectively, using a secret MAC key K. However, unlike digital signatures, which can be validated by anyone possessing the public key, MAC1 and MAC2 can only be validated by the TSA possessing the secret key K. However, if the secret MAC key were shared with some other trusted third party, then the MACs could be validated by that trusted third party, as well. Hence, even when MACs are used, it is possible for disputes arising concerning document D to be settled by some trusted third party, in addition to the original TSA who created the MACs. The binding operation may also be performed using encryption techniques, e.g., by separately encrypting $R_1$ and $R_2$ under a secret key using a symmetric key algorithm or a public key using a public key algorithm. The binding operation may also be performed using hashing techniques, e.g., by separately hashing $R_1$ and $R_2$ using a hashing algorithm and then storing the respective hash values in a repository with integrity, so that one is assured that the hash values cannot be changed.

The time-stamping procedures described herein may be implemented using general purpose programmable computers. A client program running on a user's computer could perform the steps of hashing documents and transmitting documents or hash values to the TSA. A server application running on a general purpose programmable computer controlled by the TSA could perform the steps of generating time stamp receipts, signing time stamp receipts, generating certificates, and transmitting signed time stamp receipts to users. It would also be possible to implement some or all of the steps in firmware, or in hard-wired logic.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method for time-stamping a digital document comprising:
   receiving identifying data derived from a document at an outside agency;
   creating at said outside agency a first receipt based on said identifying data;
   creating at said outside agency a second receipt, different from said first receipt, based on a time indication that indicates when the document was received at the outside agency;
   inserting a linking value into said first and second receipts that links the identifying data in the first receipt with the time indication in the second receipt;

certifying said first and second receipts at said outside agency using a cryptographic signature scheme.

2. The time-stamping method of claim 1 wherein said identifying data comprises a digital representation of at least a portion of said document.

3. The time-stamping method of claim 2 wherein said identifying data comprises a digital sequence derived by application of a deterministic function to at least a portion of said document.

4. The time-stamping method of claim 3 wherein said digital sequence is a hash value derived by application of a one-way hashing function to at least a portion of said document.

5. The time-stamping method of claim 1 wherein said first receipt comprises at least a portion of said identifying data and a nonce.

6. The time-stamping method of claim 1 wherein said first receipt comprises a digital sequence generated by applying a pre-determined function to said identifying data.

7. The time-stamping method of claim 1 wherein one of said first and second receipts comprises a user identification number associated with a user.

8. The time-stamping method of claim 7 wherein one of said first and second receipts comprises a sequential record number.

9. A method for time-stamping a digital document comprising:
   transmitting identifying data derived from said document to an outside agency;
   receiving from said outside agency a first receipt signed by said outside agency using a cryptographic signature scheme, said first receipt including a first digital sequence generated based on said identifying data;
   receiving from said outside agency a second receipt signed by said outside agency using a cryptographic signature scheme, said second receipt being different from said first receipt and containing a second digital sequence based on a time indication that indicates when the document was received at the outside agency; and
   wherein said first and second receipts comprise a linking value that links the identifying data in the first receipt with said time indication in the second receipt.

10. The time-stamping method of claim 9 wherein said identifying data comprises a digital representation of at least a portion of said document.

11. The time-stamping method of claim 10 wherein said identifying data comprises a digital sequence derived by application of a deterministic function to at least a portion of said document.

12. The time-stamping method of claim 11 wherein said digital sequence is a hash value derived by application of a one-way hashing function to at least a portion of said document.

13. The time-stamping method of claim 9 wherein said first receipt comprises at least a portion of said identifying data and a nonce.

14. The time-stamping method of claim 9 wherein said first receipt comprises a digital sequence generated by applying a pre-determined function to said identifying data.

15. The time-stamping method of claim 9 wherein one of said first and second receipts comprises a user identification number associated with a user.

16. The time-stamping method of claim 15 wherein one of said first and second receipts comprises a sequential record number.

17. The time-stamping method of claim 9 wherein a common cryptographic signature scheme is used to sign both said first and second receipts.

18. The time-stamping method of claim 9 wherein different cryptographic signature schemes are used to sign said first and second receipts.

19. The time-stamping method of claim 9 wherein said linking value is a nonce value.

\* \* \* \* \*